Feb. 2, 1932. H. LACKLER 1,843,877
INTERNAL COMBUSTION ENGINE
Filed Sept. 30, 1929
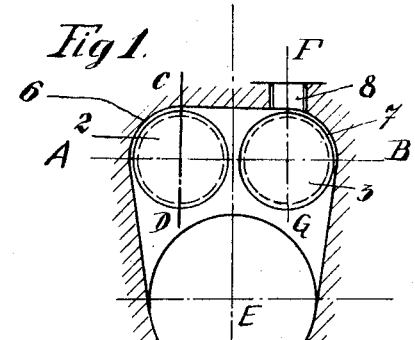
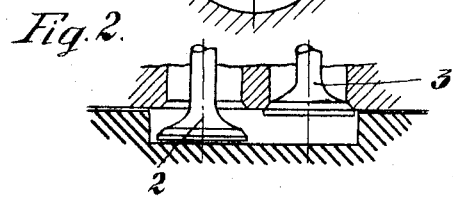
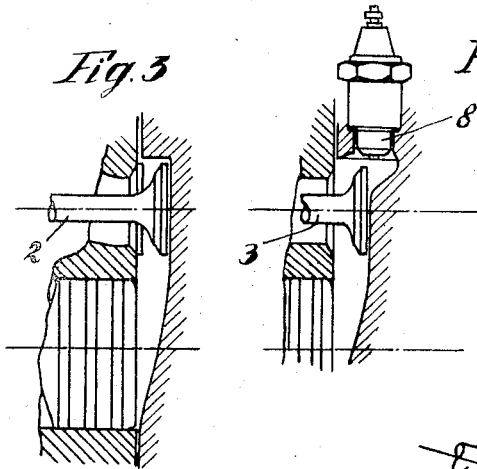
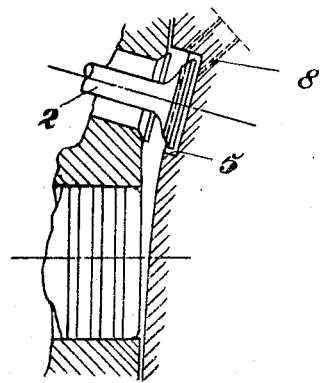
INVENTOR:
H. Lackler
By:

Patented Feb. 2, 1932

1,843,877

UNITED STATES PATENT OFFICE

HANS LACKLER, OF VIENNA, AUSTRIA

INTERNAL COMBUSTION ENGINE

Application filed September 30, 1929, Serial No. 396,358, and in Austria October 5, 1928.

This invention relates to the design of the combustion chamber, to the disposition of the sparking plugs, and to the disposition of the valves in internal combustion engines. The improvements provided by the present invention allow of the use of higher compression ratios, at highest revolution and at the highest possible mean working pressures (even at such as are produced when compressors are used for charging), without causing pre-ignition, and without subjecting the exhaust valve and the sparking plug to thermal stress above the permissible limit, than any hitherto known form of construction for internal combustion engines.

The deciding factor in the thermal stress of all the parts concerned is not the highest temperature occurring during combustion (which is a function of the compression ratio used), but rather the amount of heat transmitted by the hot exhaust gases to all the surfaces over which they pass in escaping from the cylinder during a comparatively long period of time—at least $\frac{22}{36}$ of one complete revolution.

A form of compression chamber was therefore devised in which these surfaces over which the exhaust gases pass are reduced to a minimum, with regard to the two essential parts—the exhaust valve and the sparking plug, with the result that important advantages over known constructions are obtained.

Two examples of the embodiment of the invention, which are not intended to limit the range of application, are illustrated in the accompanying drawings, in which:—

Fig. 1 is a section of the combustion chamber on a plane at right angles to the direction of the movement of the piston.

Fig. 2 is a section on the same plane as the valve stems, on the line A—B of Fig. 1.

Fig. 3 is a section through the exhaust valve (2) on the line C—D—E.

Fig. 4 is a section through the inlet valve, on the line F—G—E.

Fig. 5 shows by way of example a somewhat modified form of construction, in which the sparking plug and the valve stems are obliquely disposed.

The height of the space above the valves is adapted to the length of the stroke of the valves in such a manner that, when the exhaust valve is lifted, its upper surface (that away from the stem) is brought out of contact with the hot exhaust gases as they pass at great speed out of the combustion chamber. The surface of the roof of the combustion chamber either being smooth or having depressions 5 (Fig. 5) into which the raised valves project. In contrast to previous practise, the side walls of the compression chamber are contracted around each of the valves for about a quarter of the circumference thereof leaving only the smallest amount of play demanded by workshop considerations and compatible with the clearance between the valve stems and the valve guides.

From Figs. 1, 2, and 3 it can be seen that the combustion chamber has a flatly rectangular cross-section above the valves, and is of the usual shape towards the cylinder. Over the half of the cylinder away from the valves it is contracted down to close over the head of the piston at top dead centre; the transition from the combustion chamber to the cylinder proper is so shaped that any checking of the flow of the gases is avoided. Around the valves (2) and (3) the wall of the compression chamber is contracted according to the invention up to the edge of the valves and following a quarter of the circumference of each— (6) and (7), except for a very slight amount of play.

Figs. 3 and 4 show the valves in the raised position, and the slight amount of play, demanded by workshop considerations, between the upper surface of the head of the valve and the inner surface of the combustion chamber.

Figs. 1, 4, and 5 show the disposition of the sparking plug in accordance with the invention in a bore (8) within the range of that part of the combustion chamber wall which is contracted towards the inlet valve.

By means of these developments, the heat-absorbing surface of the exhaust valve is reduced to half that of the known forms of construction. Since on the other hand, the surfaces which give up heat remain the same as in the known forms of construction, it follows that either the temperature of the exhaust valve remains very low at normal loads, or that at the ordinary temperatures of the exhaust valve the output of the engine can be raised to a very high extent.

The present invention has the further advantage of providing, even when the largest size valves are employed, a small compression chamber of very slight superficial area and of an extremely compact and thermally advantageous form, which is free of corners in which remnants of exhaust gas could be held up or in which portions of the mixture could escape rapid ignition.

Further a novel manner of disposing the sparking plug (8) is provided, by means of which the plug is particularly well cooled and put out of reach of the hot exhaust gas stream, being at the same time enabled to effect a good igniton throughout the entire combustion chamber, without being exposed to the danger of becoming oiled or sooted up to the extent which is possible with the Ricardo head or in engines with overhead valves. The electrodes of the sparking plug (8) are disposed in a bore in that portion of the encasing wall of the combustion chamber which forms a corner of a cylinder (7) around the inlet valve (3). At the moment of the opening of the inlet valve, the cold mixture enters this bore with great velocity (since it is positively directed into the opening by the curved under surface of the head of the valve), sweeps out any remnants of exhaust gas, and cools the electrode end of the sparking plug (8) to an extent which has not hitherto been achieved. During the exhaust stroke, on the other hand, the electrodes of the sparking plug (8) are, in their position at the bottom of the bore, completely out of reach of the extremely hot exhaust gases as they pass out of the cylinder with great velocity.

In addition to the already mentioned advantages of the design of the combustion chamber and of the disposition of the valves provided by the present invention, the following further advantage is achieved. The described combustion chamber allows of the attainment of a better degree of filling and therefore of a higher output than the known forms of construction, in that the mixture, on entering, is not compelled to pass over the highly heated (at maximum output generally red hot) upper surface of the exhaust valve, which leads to a considerable increase in temperature, but only over the far cooler valve head surface obtained in accordance with the invention, with the result that a far slighter increase in temperature occurs.

I claim:—

1. An internal combustion engine with valves disposed at the side of the combustion cylinder and controlled from below, whereby the height of the combustion chamber above the valves is equal to the length of the stroke of the valves together with a space allowed for assemblage, and the side walls of the combustion chamber as to the valve side corners of the same for about a quarter of the circumference of the valve on each side are contracted to the very edge of the valves leaving only the smallest amount of play compatible with workshop considerations and the clearance between the valve stems and the valve guides.

2. An internal combustion engine with valves disposed at the side of the combustion cylinder and controlled from below, whereby the height of the combustion chamber above the valves is equal to the length of the stroke of the valves together with a space allowed for assemblage, the side walls of the combustion chamber as to the valve side corners of the same for about a quarter of the circumference of the valve on each side are contracted to the very edge of the valves leaving only the smallest amount of play compatible with the clearance between the stems of the valves and the valve guides, and the heads of the valves, in particular of the exhaust valves, when in the raised position project into a depression in the inner surface of the combustion chamber, so that said valve heads are completely withdrawn from the influence of the flowing hot exhaust gases.

3. An internal combustion engine with valves disposed at the side of the combustion cylinder and controlled from below, whereby the height of the combustion chamber above the valves is equal to the length of the stroke of the valves together with a space allowed for assemblage, and the side walls of the combustion chamber as to the valve side corners of the same for about a quarter of the circumference of the valve on each side are contracted to the very edge of the valves leaving only the smallest amount of play compatible with workshop considerations and the clearance between the valve stems and the valve guides, whereby the boring for the reception of the sparking plug is disposed on the side of the combustion chamber away from the axis of the cylinder and in the range of the inlet valve quarter of a cylinder which is formed by the contraction of the side wall of the combustion chamber towards the edge of the inlet valve, in such a manner that the cool mixture is compelled to sweep past the said sparking plug.

4. An internal combustion engine with valves disposed at the side of the combustion cylinder and controlled from below, whereby the height of the combustion chamber above the valves is equal to the length of the stroke of the valves together with a space allowed for assemblage, and the side walls of the combustion chamber as to the valve side corners of the same for about a quarter of the circumference of the valve on each side are contracted to the very edge of the valves leaving only the smallest amount of play compatible with workshop considerations and the clearance between the valve stems and the valve guides, whereby the boring for the reception of the sparking plug is disposed on the side of the combustion chamber away from the axis of the cylinder and in the range of the quarter of a cylinder which is formed by the contraction of the side wall of the combustion chamber towards the edge of the inlet valve, in such a manner that the cool mixture is compelled to sweep past the said sparking plug, and the heads of the valves, in particular of the exhaust valves, when in the raised position project into a depression in the inner surface of the combustion chamber, so that said valve heads are completely withdrawn from the influence of the flowing hot exhaust gases.

In testimony whereof I affix my signature.

HANS LACKLER.